UNITED STATES PATENT OFFICE.

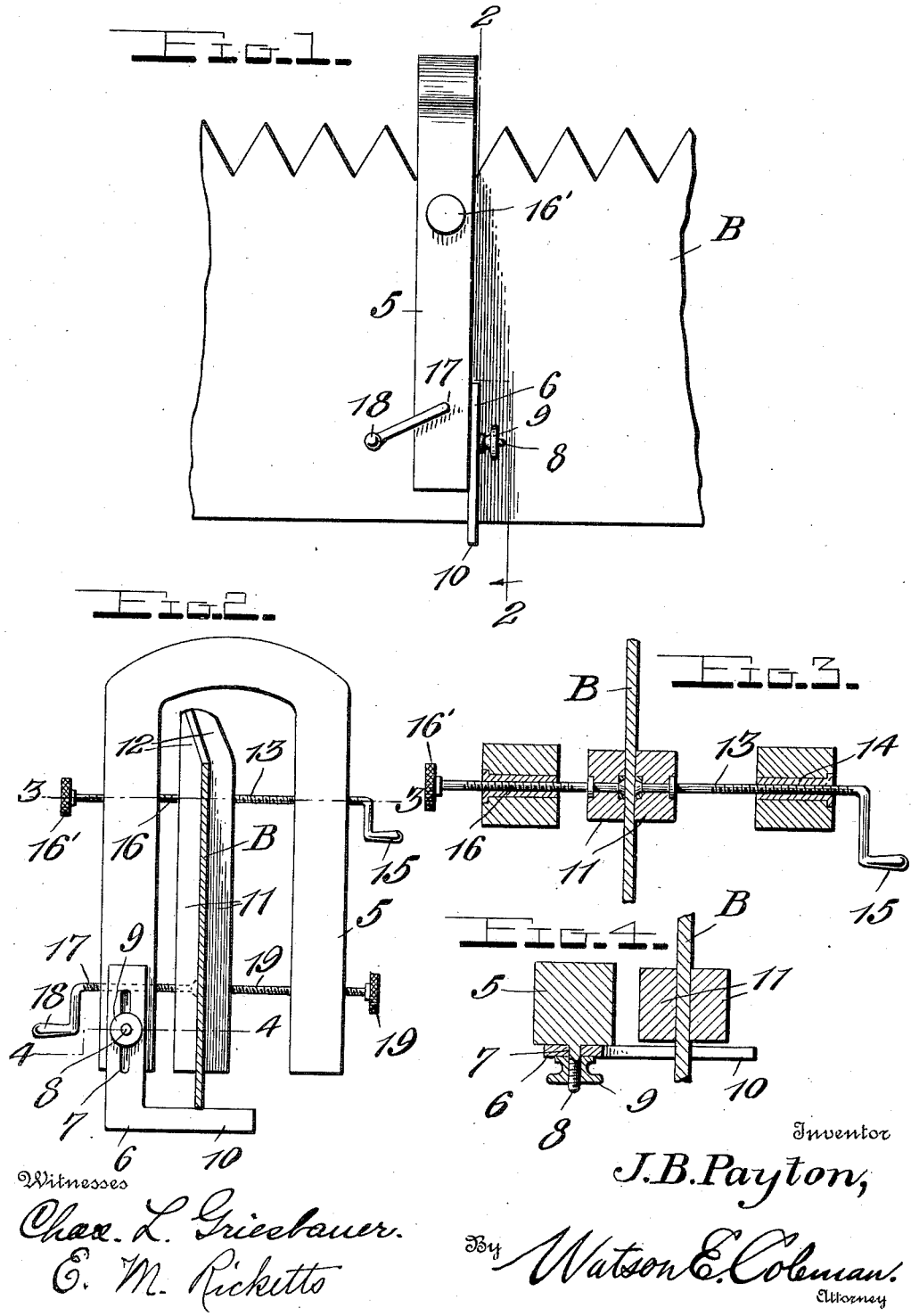

JESSE BREANT PAYTON, OF HYDESVILLE, CALIFORNIA.

SAW-SET.

1,019,352.  Specification of Letters Patent.  Patented Mar. 5, 1912.

Application filed June 2, 1910. Serial No. 564,553.

*To all whom it may concern:*

Be it known that I, JESSE B. PAYTON, a citizen of the United States, residing at Hydesville, in the county of Humboldt and State of California, have invented certain new and useful Improvements in Saw-Sets, of which the following is a specification, reference being had to the accompanying drawings.

This invention relates to an improved saw set and has for its object to provide a very simple device of this character by means of which the teeth of cross cut saws can be very quickly and easily set.

A further object resides in the provision of a saw setting device which may be arranged upon saw blades of different widths and is of such construction that the device may be readily moved upon the blade for the engagement of the setting members with the successive teeth of the saw.

With these and other objects in view, the invention consists of the novel features of construction, combination and arrangement of parts hereinafter fully described and claimed, and illustrated in the accompanying drawings, in which—

Figure 1 is a side elevation of a saw set constructed in accordance with the present invention, showing the same arranged upon a saw blade; Fig. 2 is a section taken on the line 2—2 of Fig. 1; Fig. 3 is a section taken on the line 3—3 of Fig. 2; and Fig. 4 is a section taken on the line 4—4 of Fig. 2.

Referring more particularly to the drawings 5 indicates a substantially U-shaped frame, the parallel arms of which are adapted to be disposed upon opposite sides of a saw blade B. The curved connecting portion of this frame is disposed over the teeth of the saw and to the lower end of one of the arms of the frame a guide member 6 is secured. The guide member is adjustable upon the frame so that it may be readily arranged upon saws varying in width the teeth of which vary in depth. To this end the member 6 is provided with a longitudinal slot 7 through which a threaded pin 8 fixed in the frame extends. Upon this pin a clamping nut 9 is threaded, said nut having binding engagement upon the face of the member 6 to rigidly secure the same upon the frame. It will therefore be seen that by loosening the nut 9 and moving the pin up or down in the slot 7, the guide may be relatively raised and lowered to properly position the saw blade in the same as will later appear. The member 6 is formed at its lower end with a transversely disposed arm 10 which extends beneath the edge of the saw and guides the frame in its longitudinal movement thereon.

Between the vertical arms of the frame 5 the clamping plates 11 are arranged and are disposed in parallel relation to said arms. The opposed faces of these clamping plates at their upper ends are angularly displaced in parallel relation as shown at 12 and are adapted to engage the saw tooth between them and bend the same so as to set the tooth in its proper position with relation to the adjacent saw tooth. In order to adjust the clamping members upon the saw blade I provide the adjusting rod 13. This adjusting rod has threaded engagement in a bushing 14 transversely extending through one of the arms 5 of the frame. The inner end of the adjusting rod is rotatably disposed in one of the clamping plates 11. To the outer end of the rod 13 a crank handle 15 is secured by means of which said adjusting screw may be actuated to move the clamping plate 11 inwardly. The other of said clamping plates is adjusted by means of the threaded stem 16 which is likewise engaged in a bushing in the other of the frame arms similar to the bushing 14. This rod 16 is provided with a head 16' on its outer end by means of which it may be turned to clamp the plate upon the saw tooth. A rod 17 is also threaded through one of the frame arms adjacent to its lower end and is provided with a crank or handle 18. This rod is longitudinally movable through one of the clamping plates 11 and is formed on its inner end with an enlarged head for engagement upon the blade of the saw. In the other of the frame arms an adjusting stem 19 has threaded engagement and is provided with a head 19' by means of which it may be turned to effect a more minute adjustment of the clamping member 11 after it has first been disposed upon the saw blade by the actuation of the rod 13.

In the operation of my improved saw set, the saw blade is disposed between the vertical arms of the frame as shown in Fig. 2 and the guide member 6 adjusted upon the lower edge thereof. The crank handle 15 and the stem 19 are then turned to adjust the clamping plate 11 inwardly upon one side of the saw and the rod 17 is adjusted inwardly into clamping engagement with the opposite side of the saw blade. After the blade is thus arranged between the clamping members, the rod 19 is again adjusted to firmly and rigidly clamp the plate upon the saw blade. The rods 13 and 16 are now manipulated to dispose the upper curved ends of the clamping plates 11 upon the opposite sides of the saw tooth and to bend the same between them at its proper angle with relation to the adjacent tooth. After one tooth has thus been set the various clamping rods are loosened so that the frame may be moved longitudinally upon the saw. They are then again adjusted upon the next adjacent tooth and this operation is repeated throughout the length of the saw blade.

From the foregoing it is believed that the construction and operation of my improved saw setting device will be readily understood. The parts are of simple form and may be manufactured at a comparatively low cost. The device is also durable and by its use the saw teeth may be quickly and accurately set.

While I have shown and described the preferred embodiment of the invention, it will be obvious that the same is susceptible of many minor modifications without departing from the essential feature or sacrificing any of the advantages thereof.

Having thus described the invention what is claimed is:—

In a saw set, the combination of a frame, saw engaging plates arranged therein in substantially parallel spaced relation, the opposed faces of said plates being angularly disposed at their upper extremities to correspond to the set to be given the saw teeth, adjusting rods threaded in the frame and bearing upon opposite sides of the respective plates immediately below the angularly disposed portion and other independently mounted adjusting rods threaded in the frame and bearing upon opposite sides of the plates near their lower margin, and a blade rest comprising a depending L-shaped bar adjustable vertically on one side of the frame and extending beneath the space between the plates.

In testimony whereof I hereunto affix my signature in the presence of two witnesses.

JESSE BREANT PAYTON.

Witnesses:
A. L. WALKER,
E. L. BEAN.

Copies of this patent may be obtained for five cents each, by addressing the "Commissioner of Patents, Washington, D. C."